United States Patent [19]

Ray

[11] 4,257,446
[45] Mar. 24, 1981

[54] FLUID FLOW SHUT-OFF SYSTEM

[76] Inventor: Charles W. Ray, 2827 Westbrook Dr., Buildings 3 & 4, Apt. 132, Fort Wayne, Ind. 46805

[21] Appl. No.: 43,433

[22] Filed: May 29, 1979

[51] Int. Cl.³ .......................... F16L 5/00; F16L 55/14
[52] U.S. Cl. ....................................... 137/368; 251/8; 137/371
[58] Field of Search ............... 137/363, 364, 365, 366, 137/367, 368, 369, 370, 371; 251/8, 7

[56] References Cited

U.S. PATENT DOCUMENTS

| | | | |
|---|---|---|---|
| 343,416 | 6/1886 | Adee et al. | 137/368 |
| 1,217,814 | 2/1917 | Parker | 137/365 |
| 1,310,521 | 7/1919 | Crall | 137/371 |
| 1,495,858 | 5/1924 | McGinnis | 137/368 |
| 1,872,792 | 8/1932 | Neorr | 251/8 |
| 2,099,479 | 11/1937 | Heinkel et al. | 137/367 |
| 2,285,099 | 6/1942 | Specht | 251/8 |
| 2,608,203 | 8/1952 | Butler | 137/368 |
| 2,729,231 | 1/1956 | Quest | 137/371 |
| 3,117,904 | 1/1964 | Black | 251/7 |
| 3,250,291 | 5/1966 | Roy | 137/368 |
| 3,626,497 | 12/1971 | Lambert | 251/8 |
| 3,658,086 | 4/1972 | Hart | 137/368 |

*Primary Examiner*—Alan Cohan
*Assistant Examiner*—A. Michael Chambers
*Attorney, Agent, or Firm*—Roger M. Rickert

[57] ABSTRACT

Method and apparatus for providing interruptible fluid flow to consumers is disclosed wherein a consumer distribution system for a fluid, such as natural gas, includes somewhat flexible plastic pipe with that pipe passing through buried access receptacles, such as curb boxes, at strategic locations for easy access to a short section of the supply line at each receptacle location. Each receptacle is adapted to receive a removable shut-off tool having a generally C-shaped frame with a slidable intermediate member for spanning the buried resilient service line within the access enclosure and having a threaded coupling arrangement for collapsing the service line between one end of the C-shaped member and the intermediate slidable member to squeeze the line sufficiently to interrupt fluid flow therethrough. The removable shut-off tool is typically left in the curb box only so long as it is needed there to maintain the blockage of flow with the tool being removed and flow resumed when service suspension is no longer desired.

8 Claims, 8 Drawing Figures

FLUID FLOW SHUT-OFF SYSTEM

BACKGROUND OF THE INVENTION

The present invention relates generally to fluid distribution systems and more particulary to such systems having buried resilient fluid supply lines. Even more particularly, the present invention relates to a versatile and economical arrangement for selectively interrupting fluid flow in certain lines of such a fluid distribution system.

Perhaps the most commonly known and used fluid distribution systems are the buried conduit systems for supplying water and natural gas to businesses and residences and it is in this type environment in which the present invention will be described. Such systems typically employ main supply lines of relatively large cross-sectional area, feeding smaller service lines which run from the main lines to a particular consumer. It is frequently desirable to interrupt service to one or more consumers, for example, during line repair or maintenance, or during the construction and installation of additional service lines. Service interruptions are sometimes also occasioned by past due bills or simple non-use of the fluid by a particular consuming facility for an extended period of time.

One way commonly employed to interrupt fluid flow service is by the simple closing of a valve at the fluid source. This, of course, interrupts service to all consumers and is typically not desirable. Improved selectivity in the fluid interruption scheme is frequently achieved by providing so-called curb boxes which are access enclosures buried in the ground with their uppermost portion approximately flush or level with the surrounding terrain and having a removable cap through which access to an in-line shut-off valve may be obtained. A fluid distribution array with such periodic in-line valves is quite well suited to the normal use requirements but has the rather substantial drawback that a large number of relatively expensive valves must be built into the system at the selected locations so that a shut-off valve will be available when and where it is required, however, the vast majority of these valves are quite infrequently and indeed sometimes never actually used. Thus, while there is a relatively high investment in valving the distribution system, the utilization of this investment is quite poor.

It is also known in such distribution systems, particularly in the event of an emergency leak situation, to uncover the supply line and interrupt fluid flow therethrough by physically squeezing the line shut. Commercially available line squeezing devices are quite large, generally requiring two men for positioning and actuating the line squeezer, and frequently their use renders the line unsuitable for further use.

The use of plastic distribution lines, particularly in natural gas and water supply systems, has become fairly common in recent years, however, the schemes for selective service interruption remain about the same as described above. There is a need for an easily and quickly interruptible fluid distribution system having a low initial installation cost.

SUMMARY OF THE INVENTION

Among the several objects of the present invention may be noted the provision of a fluid distribution system characterized by its versatility and economy of installation; the provision of a fluid distribution system not having a complete expensive valve arrangement in each potential shut-off location but rather employing a removable valve structure which may be deployed at a shut-off location only in the event that service is to be suspended at that location; the provision of a method and apparatus for distributing fluid, such as natural gas or water, to consumers, having the advantages of curb box valve arrangements without the attendant expense; the provision of a curb box arrangement having a flexible supply line passing therethrough, with the curb box being especially adapted to receive a removable tool for interrupting fluid flow in the line by squeezing the line shut; and the provision of a method and apparatus for interrupting gas service in a buried resilient service line in a region where the service line passes through a sunken access enclosure. These as well as other objects and advantageous features will be in part apparent and in part pointed out hereinafter.

In general, an easily and quickly interruptible fluid flow in a buried pipe line distribution system is achieved by positioning a number of sunken access enclosures at selected locations in the distribution system to encompass a length of the distribution pipe at each location so as to provide access to the length of pipe at that location without the necessity of digging a hole in the ground each time access to the length of pipe is required. A removable shut-off mechanism is placed in the enclosure only when interruption in fluid flow is desired.

Also in general and in one form of the invention, fluid service to a consumer is interrupted by spanning a flexible service line with relatively movable jaws in a region of the service line which lays below ground level and within a curb box. The jaws are urged toward one another to grip the service line and forced further toward one another to collapse the line and prevent the flow of fluid therethrough. The curb box with the relatively movable jaws maintaining the line collapsed for the duration of the interruption of service may have a cover placed thereon, if desired.

Still further in general and in one form of the invention, a removable gas line shut-off tool for interrupting natural gas service in a buried resilient service line in a region where that service line passes through a sunken access enclosure includes a C-shaped frame with an intermediate member slidably coupled thereto for movement between the opposite ends thereof and a threaded coupling between one end of the C-shaped member and the intermediate member for moving the intermediate member toward the other end of the C-shaped member to squeeze the service line and block the passage of gas therethrough. To facilitate operation of the tool when that tool is in position within a sunken access enslosure and spanning a supply line to be squeezed shut, the lower end of the tool is provided with an arrangement for engaging the access enclosure to prevent rotation of the C-shaped portion so that the threaded couplng may be engaged and turned, for example by a removable handle, to force the intermediate member toward the other end of the C-shaped member to squeeze the supply line shut.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
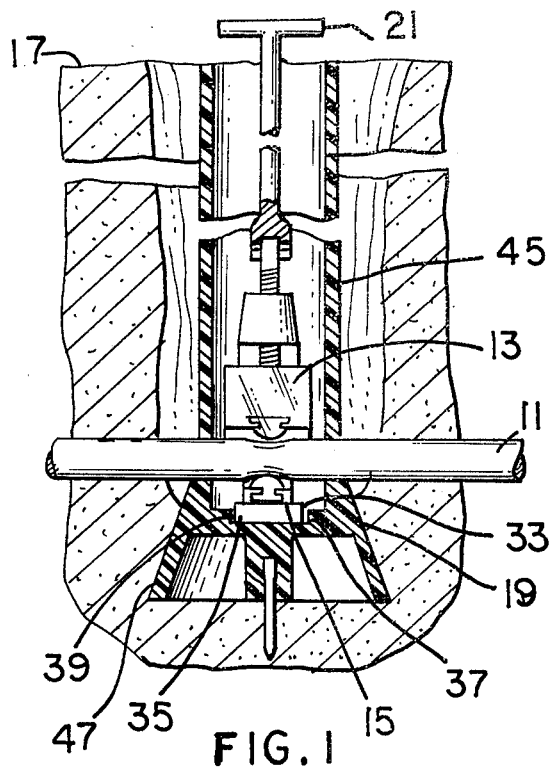
FIG. 1 is a sectional view of a curb box containing a removable shut-off tool, resilient service line and separately removable tool handle, according to the invention in one form thereof.
Figure 2:
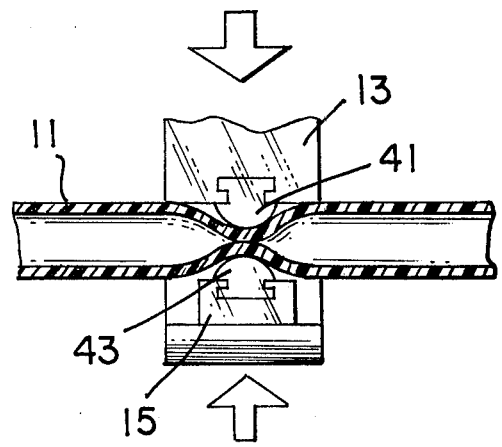
FIG. 2 is a view of the jaws of the tool of FIG. 1 in their service interrupting position.
Figure 3:
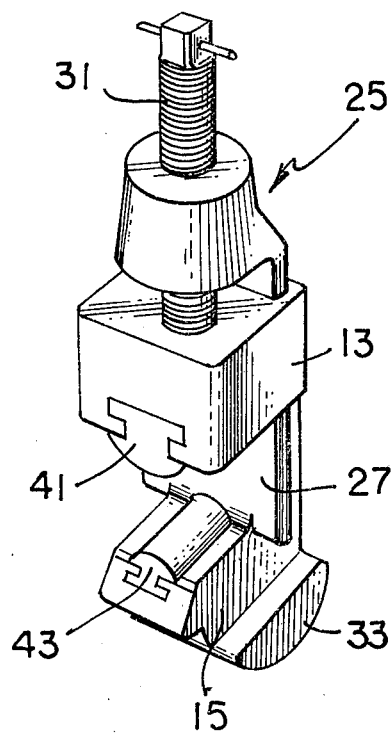
FIG. 3 is a perspective view of the removable tool of FIG. 1.
Figure 4:
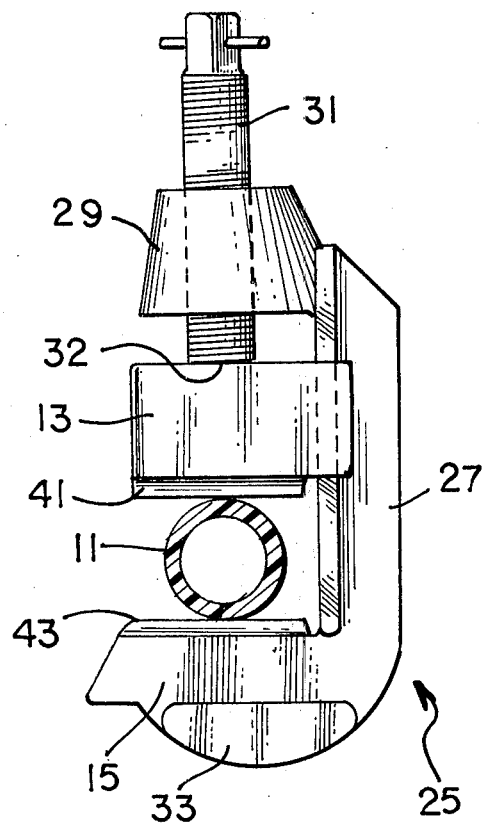
FIG. 4 is a side view of the tool of FIGS. 1 and 3.

Referring now to the drawing generally, fluid service, such as for example, natural gas service, to a consumer may be interrupted by spanning a flexible service line 11 with relatively movable jaws 13 and 15 in a region of the service line which lies below ground level 17 and within a curb box or sunken access enclosure 19. The jaws are urged toward one another to grip the service line as seen in FIGS. 1 and 4 and forced further toward one another as indicated by the arrows in FIG. 2 to collapse the line and prevent the flow of fluid therethrough. Once service has been interrupted by this technique the tool handle 21 may be removed and a cover or cap 23 placed over the curb box with the shut-off tool 25 remaining in the curb box to maintain the line collapsed.

The removable shut-off tool is illustrated in FIGS. 1 through 4 and is seen to include a C-shaped frame or member 27 having an intermediate member, such as jaw 13, slidably coupled thereto for movement along the C-shaped member between opposite ends thereof. A threaded coupling arrangement interconnects the intermediate member and one end of the C-shaped frame for moving the intermediate member along the frame and toward the other end of the frame, such as jaw 15. This threaded coupling may, for example, be accomplished by threading the hole in end 29 of the frame through which threaded actuating rod 31 passes with the threaded actuating rod end 32 simply abutting the intermediate member so that rotation of the threaded actuating rod 31, as by rotation of the removable handle 21, forces jaw 13 toward jaw 15. Reversal of the direction of rotation merely relieves the force on the intermediate member, however, coupling arrangements of known types between the threaded actuating rod 31 and the intermediate member 13 may be devised so that the intermediate member moves with the threaded actuating rod in either axial direction of motion of that actuating rod.

To prevent rotation of the entire shut-off tool when the threaded actuating rod 31 is rotated, the tool is provided with a pair of opposed relatively flat and generally parallel faces 33 and 35 near the lower end thereof, which faces engage corresponding faces 37 and 39 of the sunken access enclosure 19 in a rotation preventing manner. With the tool disposed in the rotation preventing position illustrated in FIG. 1, service line 11 is spanned by jaws 13 and 15.

These jaws 13 and 15 are seen to include opposed facing, gently curved jaw portions 41 and 43 for engaging and squeezing the service line to interrupt gas flow through that line without severing the line.

Figure 5:
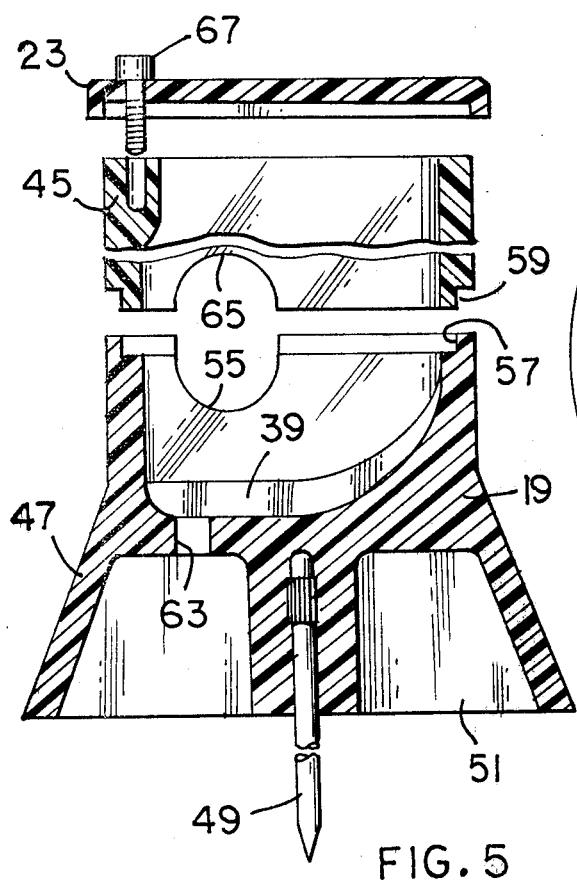
FIG. 5 is a sectional view of the curb box of FIG. 1 normal to the plane of the view of FIG. 1 and illustrating the curb box cover.
Figure 7:
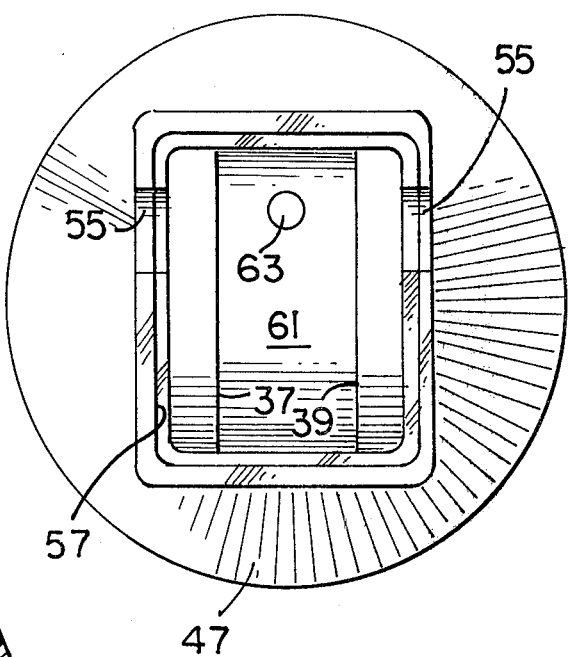
FIG. 7 is a top view of the bottom portion of the curb box of FIGS. 1 and 5.
Figure 6:
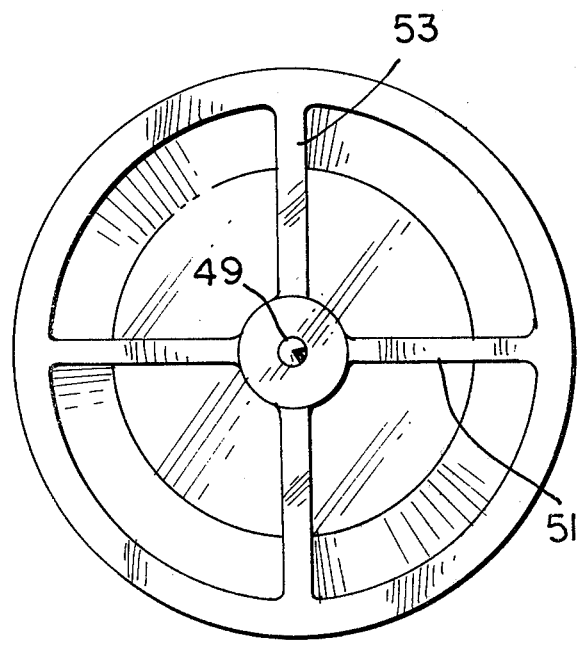
FIG. 6 is a bottom view of the curb box of FIGS. 1 and 5.
Figure 8:
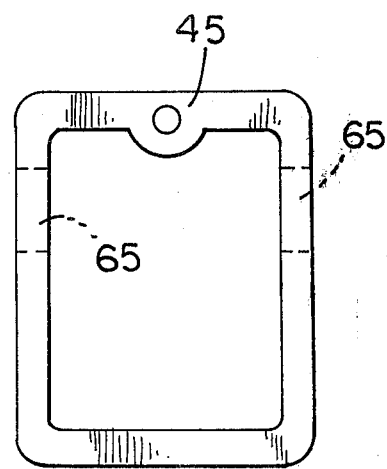
FIG. 8 is a top view of the top portion of the curb box of FIGS. 1 and 5.

Comparing now FIGS. 1 and 5, it will be noted that the service line 11 is held between upper and lower portions 45 and 47 respectively of the sunken access enclosure. The service line is displaced laterally from a central location in the enclosure, as best seen in FIG. 5, to allow the tool to be moved vertically past the service line and then generally horizontally into position, spanning the service line with the rotation preventing surfaces 33 and 35, engaging corresponding surfaces 37 and 39, which are the opposed faces of a restriction into which the tool rotation preventing portion slides as the tool is moved generally horizontally into its spanning position.

The curb box, as illustrated in FIGS. 1 and 5 through 8, is installed typically when the distribution line system is installed but of course may be installed at a later date, as desired. The curb box includes the lower portion 47 having a spike or pin 49 extending downwardly therefrom with this pin serving to hold the curb box in position until such time as the box is buried. The lower portion 47 also includes ribs, such as 51 and 53 which when the box is completely buried tend to help prevent rotation of the box due to actuation of the shut-off tool. The box lower portion is of course cut out at 55 to receive the distribution pipe and the two halves 45 and 47 may include mating edges 57 and 59 with those two halves merely joined with the dirt filled in around the curb box being sufficient to hold the two halves in place or the two halves may be additionally welded or joined with screws, as desired. The interior bottom of the lower curb box portion, in addition to having the recess 61 for receiving the tool in a rotation preventing manner, is also provided with a drain opening 63 to prevent the accumulation of dirt, moisture and the like in the bottom of the curb box.

The upper portion of the curb box includes a cutaway section 65 for covering the pipe line and near the top thereof includes cap 23 fastened, for example, by a pentagonal bolt 67 to the upper portion 45.

When installing a new fluid distribution system or when retrofitting an existing fluid distribution system, a plurality of the sunken access enclosures or curb boxes would of course be positioned at selected locations in the system with the number of such curb boxes being substantially larger than the number of required shut-off tools since on the average most of the lines in the system would be active. This vastly reduced number of shut-off tools represents a significant cost savings in the system while still providing the versatility of being able to shut off the selected supply lines, as desired.

From the foregoing, it is now apparent that a novel fluid distribution system and removable shut-off tool therefor have been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. The method of providing easily and quickly interruptible fluid flow to consumers by way of a buried pipe line distribution system comprising the steps of:

positioning a plurality of sunken access enclosures at selected locations in the distribution system to encompass a length of pipe at each location for providing access to the length of pipe at that location without the necessity of digging a hole at the location each time access to the length of pipe is required with the length of pipe located between upper and lower portions of the sunken access enclosure with sufficient clearance between the length of pipe and the enclosure to allow a tool to be moved vertically past the length of pipe and then generally horizontally into position spanning the pipe and with the enclosure including a restriction below the length of pipe; and placing a removable shut off mechanism in the enclosure only when interruption in fluid flow is desired, the shut off mechanism including a C-shaped frame with an intermediate member slidably coupled to the frame for movement therealong and a threaded coupling between one end of the C-shaped member and the intermediate member for moving the intermediate member toward the one end of the C-shaped member, the step of placing including moving the shut off mechanism generally vertically past the length of pipe and then generally horizontally into position spanning the length of pipe with opposed facing gently curved jaw portions of the shut off mechanism spanning the pipe and aligning and engaging mating portions of generally flat parallel sides of the shut off mechanism and the enclosure restriction to prevent relative rotation between the enclosure and one part of the shut off mechanism.

2. The method of claim 1 wherein the step of placing includes removing a cap from the enclosure to gain access to the enclosure.

3. The method of claim 1 wherein a further step includes moving the jaw portions toward one another to collapse the pipe and interrupt fluid flow.

4. The method of claim 3 comprising the additional step of reestablishing fluid flow by releasing the jaws to move away from one another allowing fluid pressure and pipe resilience to reform a fluid passageway through the length of pipe.

5. The method of claim 4 comprising the further steps of removing the shut off mechanism from the enclosure after fluid flow has been reestablished, and placing a cap over the top of the enclosure after the shut off mechanism has been removed.

6. The method of claim 1 including the further steps of gripping the length of pipe between relatively movable jaws of the shut off mechanism, and forcing those jaws toward one another to collapse the pipe interrupting fluid flow by rotating said threaded coupling to move said intermediate member of the shut off mechanism relative to said C-shaped member of the shut off mechanism and the enclosure.

7. A removable gas line shut off tool for interrupting gas service in a buried resilient service line in a region where the service line passes through a sunken access enclosure, the tool comprising:

a C-shaped frame member;

an intermediate member slidably coupled to the C-shaped member for movement along the C-shaped member between opposite ends thereof, the intermediate member and the other end of the C-shaped member including opposed facing gently curved jaw portions for engaging and squeezing the service line to interrupt gas flow through the service line without severing the service line;

a threaded coupling between one end of the C-shaped member and the intermediate member for moving the intermediate member toward the other end of the C-shaped member; and means near the other end of the C-shaped member for engaging a sunken access enclosure to prevent rotation of the C-shaped member relative thereto so that when the tool is in rotation preventing position within the enclosure, the service line is spanned by the intermediate member and the other end of the C-shaped member, the service line being held between upper and lower portions of the sunken access enclosure and displaced laterally from a central location to allow the tool to be moved vertically past the service line and then generally horizontally into positions spanning the service line, the sunken access enclosure including a restriction below the service line into which the tool rotation preventing means slides as the tool is moved generally horizontal into spanning position, the tool rotation preventing means including generally flat parallel side portions for engaging the restriction to prevent rotation of the C-shaped member relative to the restriction whereby the threaded coupling may be engaged and turned to force the intermediate member toward the other end of the C-shaped member while the tool is within the sunken access enclosure.

8. The tool of claim 7 further comprising a removable extension handle engageable with the threaded coupling and extending beyond the sunken access enclosure to facilitate turning the threaded coupling when the service line is spanned by the intermediate member and the other end of the C-shaped member.

* * * * *